Mar. 27, 1923.
D. M. WALLACE.
AUTOMOBILE LAMP KIT.
FILED JAN. 25, 1922.
1,449,961.
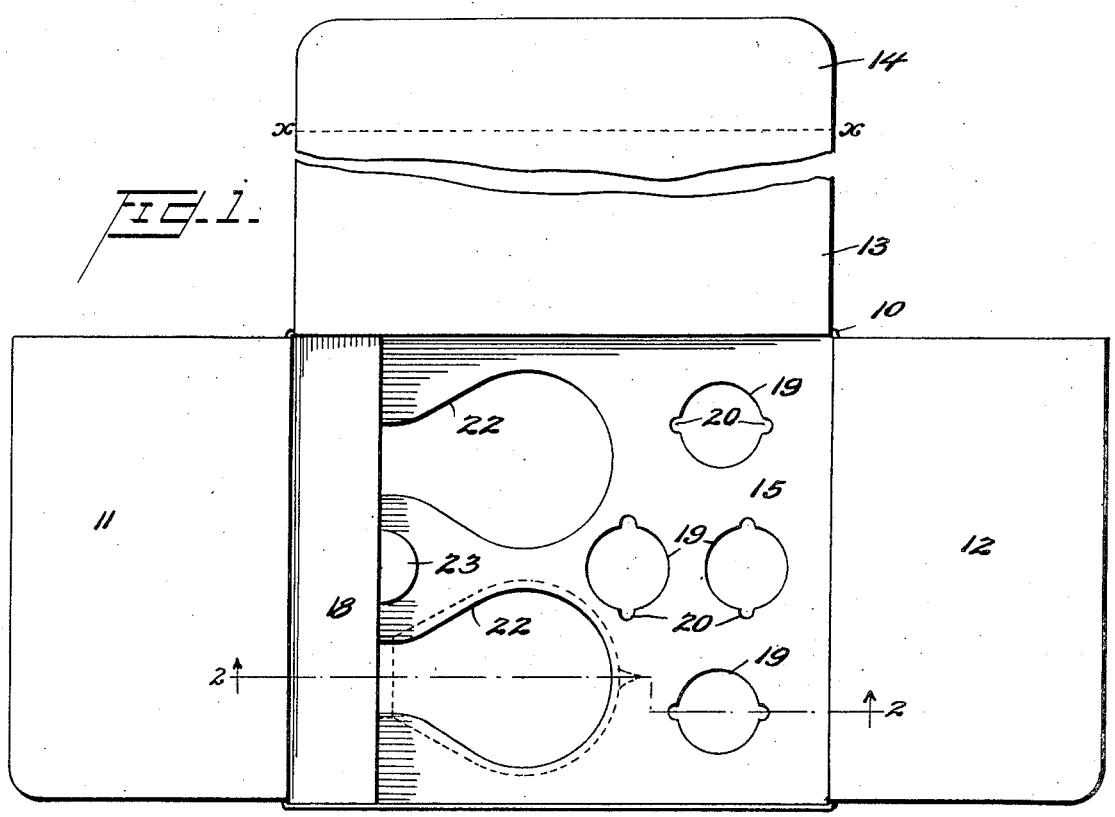
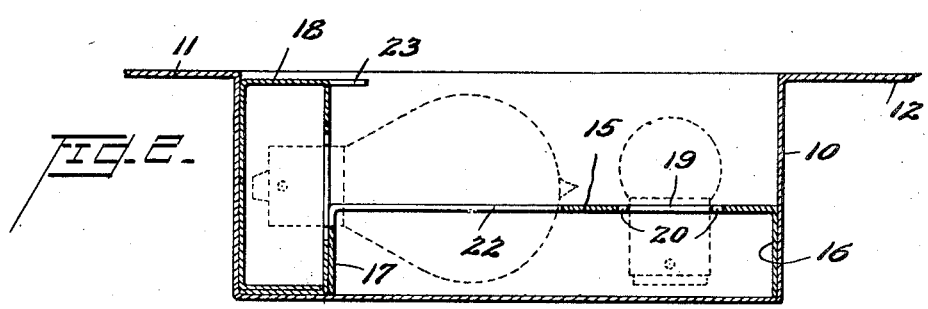
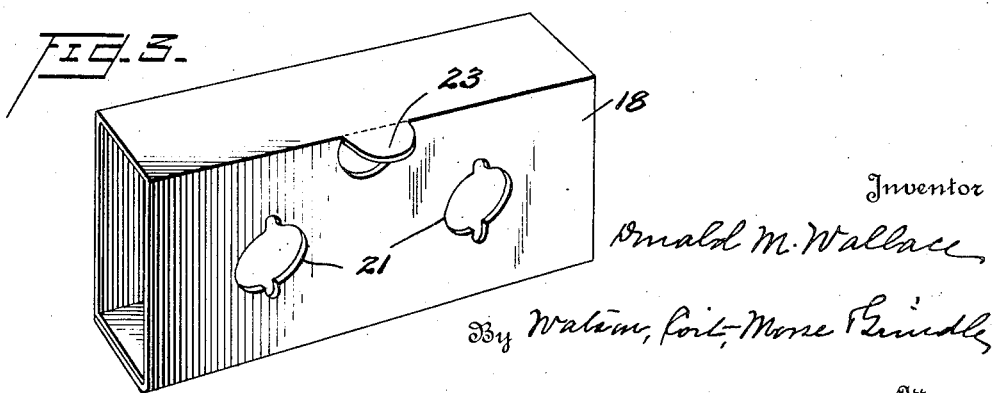
Inventor
Donald M. Wallace
By Watson, Coit, Morse & Grindle
Attorneys Patented Mar. 27, 1923.

1,449,96...

UNITED STATES PATENT OFFICE.

DONALD M. WALLACE, OF MAPLEWOOD, NEW JERSEY, ASSIGNOR TO THE LORD BALTIMORE PRESS, INC., OF BALTIMORE, MARYLAND, A CORPORATION OF DELAWARE.

AUTOMOBILE LAMP KIT.

Application filed January 25, 1922. Serial No. 531,658.

*To all whom it may concern:*

Be it known that I, DONALD M. WALLACE, a citizen of the United States, and resident of Maplewood, New Jersey, have invented a certain new and useful Improvement in Automobile Lamp Kits, of which the following is a specification.

This invention relates to a kit or container for incandescent electric lamps and in the specific form shown is particularly adapted to receive and properly hold a complete set of lamps for an automobile. Its novel features reside principally in the character and structural arrangement of supports in a box-like container whereby the lamps may be easily inserted or removed and in which they are firmly held in place out of contact with each other in such way as to avoid breakage and whereby lamps of different sizes are so assembled as to reduce the dimensions of the container to a minimum. The kit constituting the invention also has the advantages of simplicity of construction and low cost of manufacture. It is particularly useful for the owners of automobiles since the lamps on them often burn out or fail to operate for some reason in places where it is impossible to secure substitute lamps. The fragile nature of the bulbs makes it difficult to pack them securely and protect them from contact with other things which will be likely to break them, and the present invention is designed to properly hold and protect a full set of lamps to supply all of the lights of an automobile in compact form. The novel features will be fully understood from the following description, taken with the drawing.

In the drawings,

Figure 1 is a plan view looking down on a device embodying the invention, one of the larger lamps being shown in dotted lines;

Figure 2 is a vertical section on the line 2—2 of Figure 1; and

Figure 3 is a perspective view of the vertical end support which fits in the container;

In the preferred form shown in the drawings, the container proper consists of a rectangular box which is composed of cardboard having flaps 11 and 12 extending from the upper edges of the sides of the box and a main flap 13 extending from the back wall of the box and being scored on the line $x$—$x$ so as to form the cover for the box with the flap 14 beyond the line $x$—$x$ bent at right angles and extending down within the box at the edge serving to hold it closed.

Within the box there is a support 15 formed of cardboard arranged in a horizontal plane a material distance above the bottom of the box and having down-turned side flanges 16 and 17 at its edges resting at their lower ends on the bottom of the box and spacing the support from the bottom. This support 15 fits the inner rectangular surfaces on the box on three sides but is spaced from the end wall of the box on the other side a sufficient distance to permit the interposition of an upright support 18. This upright support 18 is formed of cardboard and is rectangular in cross-section and hollow with open ends and is of such height and width as to fit in the end of the box between the end of the support 15 and the wall of the box and to extend from the bottom to the top of the box. The horizontal support 15 has a series of circular openings 19 in it to receive the sockets of the small incandescent lamps such as the tail lamp or the dash lamp, whereby such lamps may be inserted through these openings vertically until the support is in contact with the bottom of the bulb above the socket and thus supports it. The opening is preferably of such size that the socket will closely fit in it and by reason of the yielding character of the material will be yieldingly held. Each opening 19 furthermore is provided with a pair of side notches 20 to permit the passage of the projecting ends of the locking pins on the socket of the lamp and thus after a lamp is in place turning it slightly on its axis will lock it to the support.

The vertical support 18 has side openings 21 in one side midway between the top and bottom and they are of such size as to fit around the socket portion of the electric lights, which are used as the headlight and which are materially larger than those heretofore mentioned mounted on support 15. The support 15 has in the end next to the support 18 openings 22 having the shape of the bulb of the headlights but of slightly less size. These openings extend through the end edge of the support 15 and downward in its depending flange in semi-circular form so that the bulbs of the headlights projecting from the vertical support may rest longitudinally on the edges of these openings in the horizontal support 15. This arrangement of the supports by which the larger lamps are arranged in horizontal position, while the smaller lamps are arranged in vertical position, makes it possible to make the package of much less depth than would be necessary if all lamps were lined in one direction. The vertical support is removable in a vertical direction from the box and is preferably provided with a tab 23 for the purpose. The head light bulbs may be inserted in the upright support before it is placed in position in the box. When the support is in position the lamps will be supported against movement in any direction by contact with the supports and since they are formed of comparatively soft material there is no danger of injury. Since there are ordinarily two small lamps at the front of the car in addition to the headlight lamps, the horizontal support is preferably provided with four openings to receive them as well as the dash and tail light lamps.

It will be understood that the invention is not limited to the specific form shown in the drawings for purposes of illustration beyond what is required by the following claims.

What is claimed is:

1. A kit for a set of electric incandescent lamps for automobiles comprising a box-like casing having a closable top, a transverse support thereon spaced a material distance from the bottom provided with openings of such size and shape as to permit the socket portions of the smaller size lamps to pass therethrough with a close fit but not the bulb and with two larger openings extending through one end edge of the support of such shape and size that the bulbs of the headlight lamps placed in them horizontally with their sockets projecting beyond said end edge will fit them near but below the central longitudinal planes of said bulbs, and a vertical support at the end of said transverse support spaced from the end of the casing and provided with openings of such size, shape and position as to closely fit around the projecting sockets of the headlight lamps.

2. A kit for a set of electric incandescent lamps for automobiles comprising a box-like casing, having a closable top, a transverse support thereon spaced a material distance from the bottom provided with openings of such size and shape as to permit the socket portions of the smaller size lamps to pass therethrough with a close fit but not the bulb and with two larger openings extending through one end edge of the support of such shape and size that the bulbs of the headlight lamps placed in them horizontally with their sockets projecting beyond said central longitudinal planes of said bulbs, and a vertical support at the end of said transverse support spaced from the end of the casing and provided with openings of such size, shape and position as to closely fit around the projecting sockets of the headlight lamps, the said supports being separately removable from said casing.

3. A kit for a set of electric incandescent lamps for automobiles comprising a box-like casing having a closable top, a transverse support thereon spaced a material distance from the bottom provided with openings of such size and shape as to permit the socket portions of the smaller size lamps to pass therethrough with a close fit but not the bulb and with two larger openings extending through one end edge of the support of such shape and size that the bulbs of the headlight lamps placed in them horizontally with their sockets projecting beyond said end edge will fit them near but below the central longitudinal planes of said bulbs, and a vertical support at the end of said transverse support spaced from the end of the casing and provided with openings of such size, shape and position as to closely fit around the projecting sockets of the headlight lamps, the said supports being composed of yielding material such as cardboard.

4. A kit for a set of electric incandescent lamps for automobiles comprising a box-like casing having a closable top, a transverse support thereon spaced a material distance from the bottom provided with openings of such size and shape as to permit the socket portions of the smaller size lamps to pass therethrough with a close fit but not the bulb and with two larger openings extending through one end edge of the support of such shape and size that the bulbs of the headlight lamps placed in them horizontally with their sockets projecting beyond said end edge will fit them near but below the central longitudinal planes of said bulbs, and a vertical support at the end of said transverse support spaced from the end of the casing and provided with openings of such size, shape and position as to closely fit around the projecting sockets of the headlight lamps, the said supports being composed of yielding material such as cardboard, and the transverse support having integral side flanges extending downwardly close to the walls of the casing and serving to space it from the bottom of the casing.

5. A kit for incandescent electric lamps comprising a box, and supporting means therein, so constructed and arranged as to engage and hold small lamps with their axes at right angles to the bottom and comparatively large lamps with their axes parallel to and substantially midway between the top and bottom walls of said box.

6. A kit for incandescent electric lamps comprising a box, and supporting means therein, so constructed and arranged as to engage and hold small lamps with their axes at right angles to the bottom and comparatively large lamps with their axes parallel to and substantially midway between the top and bottom walls of said box, the said supporting means including a horizontal member having one end spaced from the adjacent end of the box and provided with inwardly extending openings from that end so shaped that their margins will make longitudinal contact with and support the bulbs of said comparatively large lamps and a vertically arranged supporting member between the end of said first member and the end of the box having side openings alined with said inwardly extending openings surrounding and fitting the socket portions of said lamps of large size.

7. A device for receiving and holding incandescent electric lamps comprising a box having a depth slightly greater than the largest diameter of the bulb of the lamps, a support having a height substantially equal to the depth of the box adapted to fit one end of the box and to move downwardly therein to the bottom and adapted substantially midway between its top and bottom to receive and hold the sockets of lamps with their bulbs projecting horizontally and horizontal supporting means in the box adapted to engage the sides of the projecting bulbs and to abut the side of said first mentioned support.

8. A kit for a set of electric incandescent lamps for automobiles comprising a rectangular box, a hollow vertical cardboard support rectangular in cross section of such length and heighth as to fit in and fill one end of the box and having openings in one side adapted to closely fit around the sockets of the headlight lamps next to the bulbs and a cardboard support in horizontal position substantially midway between the top and bottom extending from side to side and from one end to said first mentioned support having down-turned flanges at its edges resting on the bottom and openings formed in the end portion next to the vertical support and its flange of such shape, size and position that the bulbs of the headlight lamps projecting from said vertical support will fit and rest on their surrounding edges along their side portions.

9. A kit for a set of electric incandescent lamps for automobiles comprising a rectangular box, a hollow vertical cardboard support rectangular in cross section of such length and heighth as to fit in and fill one end of the box and having openings in one side adapted to closely fit around the sockets of the headlight lamps next to the bulbs and a cardboard support in horizontal position substantially midway between the top and bottom extending from side to side and from one end to said first mentioned support having down-turned flanges at its edges resting on the bottom and openings formed in the end portion next to the vertical support and its flange of such shape, size and position that the bulbs of the headlight lamps projecting from said vertical support will fit and rest on their surrounding edges along their side portions, and said horizontal support being provided with openings through which the sockets of the smaller lamps, such as the tail light and dash light lamps will pass vertically with their bulbs resting on the margins of said openings.

10. A kit for a set of electric incandescent lamps for automobiles comprising a rectangular box, a hollow vertical cardboard support rectangular in cross section of such length and heighth as to fit in and fill one end of the box and having openings in one side adapted to closely fit around the sockets of the headlight lamps next to the bulbs and a cardboard support in horizontal position substantially midway between the top and bottom extending from side to side and from one end to said first mentioned support having down-turned flanges at its edges resting on the bottom and openings formed in the end portion next to the vertical support and its flange of such shape, size and position that the bulbs of the headlight lamps projecting from said vertical support will fit and rest on their surrounding edges along their side portions, and said horizontal support being provided with openings through which the sockets of the smaller lamps such as the tail light and dash light lamps will pass vertically with their bulbs resting on the margins of said openings, the said sockets being adapted to interlock with said supports when inserted in the openings and given a partial revolution on their axes.

In testimony whereof I hereunto affix my signature.

DONALD M. WALLACE.